Jan. 26, 1971  T. R. QUERMANN  3,557,629
PICK-OFF AND TORQUING DEVICE
Filed April 10, 1968  6 Sheets-Sheet 1

INVENTOR.
THOMAS R. QUERMANN
BY
*H P Ferry*
ATTORNEY

Jan. 26, 1971  T. R. QUERMANN  3,557,629
PICK-OFF AND TORQUING DEVICE
Filed April 10, 1968  6 Sheets-Sheet 2

INVENTOR.
THOMAS R. QUERMANN
BY
*H.P. Terry*
ATTORNEY

INVENTOR.
THOMAS R. QUERMANN
BY
ATTORNEY

Jan. 26, 1971 T. R. QUERMANN 3,557,629
PICK-OFF AND TORQUING DEVICE
Filed April 10, 1968 6 Sheets-Sheet 6

INVENTOR.
THOMAS R. QUERMANN
BY
*HP Jerry*
ATTORNEY

United States Patent Office 3,557,629
Patented Jan. 26, 1971

3,557,629
PICK-OFF AND TORQUING DEVICE
Thomas R. Quermann, Huntington Station, N.Y., assignor to Sperry Rand Corporation, a corporation of Delaware
Filed Apr. 10, 1968, Ser. No. 720,162
Int. Cl. G01c 19/28
U.S. Cl. 74—5.6
12 Claims

ABSTRACT OF THE DISCLOSURE

A pick-off device for use with a sensitive element rotatably supported by a shaft for movement within a housing in which the pick-off means has one portion mounted on the sensitive element, another portion mounted on the shaft and still another portion mounted on the housing for providing an output signal accurately representative of the relative displacement between the sensitive element and the shaft with respect to axes referenced to the housing. The device may also include torquing apparatus integral therewith.

BACKGROUND OF THE INVENTION

Field of the invention

The present invention pertains to pick-off and torquing devices particularly of the type suitable for inertial apparatus.

Description of the prior art

Prior art types of pick-off and torquing devices for use with inertial apparatus usually sense the position or movement of the sensitive element with respect to the housing within which the sensitive element is disposed. In the case of a rotating sensitive element, in the event that there is any shaft misalignment of the drive shaft with respect to the housing referenced pick-off, an error results in the output signal which in the case of a gyroscope may be considered a bias drift.

Other prior art types of pick-off and torquing devices such as shown in U.S. Pat. No. 3,089,044 have the pick-off coils rotating with the sensitive element and require additional electronic equipment to resolve the output signal with respect to the housing axes.

Prior means for accomplishing this have thus required either separate pick-offs, rotary transformers and resolvers or used a two-pole rotating magnet which generated an A.C. voltage in fixed coils through shaft mounted pole pieces. This latter arrangement produced a spin frequency signal which required phase detection to establish housing referenced axes.

The problem of eliminating the bias drift of a gyro of the free rotor self-suspension type is particularly acute since the shift in the position of the drive shaft axis with respect to a housing referenced pick-off may cause a substantial bias drift of the gyro. Generally speaking, the same problem is inherent with certain types of accelerometers having rotating sensitive elements.

SUMMARY OF THE INVENTION

The present invention concerns a pick-off device having the pick-off elements mounted on the housing of the inertial apparatus thereby defining the housing referenced axes in terms of the physical position of the housing mounted pick-off elements thus eliminating the need for resolving or phase detection apparatus. Further, one portion of the pick-off is mounted on the sensitive element with another portion of the pick-off mounted on the drive shaft. This permits compensation for misalignment of the shaft with consequent minimization of drift in terms of a gyro, and null averaging in terms of an accelerometer. In addition, the torquing function with respect to a gyroscopic apparatus can be made integral with the pick-off device thereby making the combination more compact in lieu of using separate pick-off and torquing devices.

DESCRIPTION OF THE PREFERRED EMBODIMENTS

Figure 1:
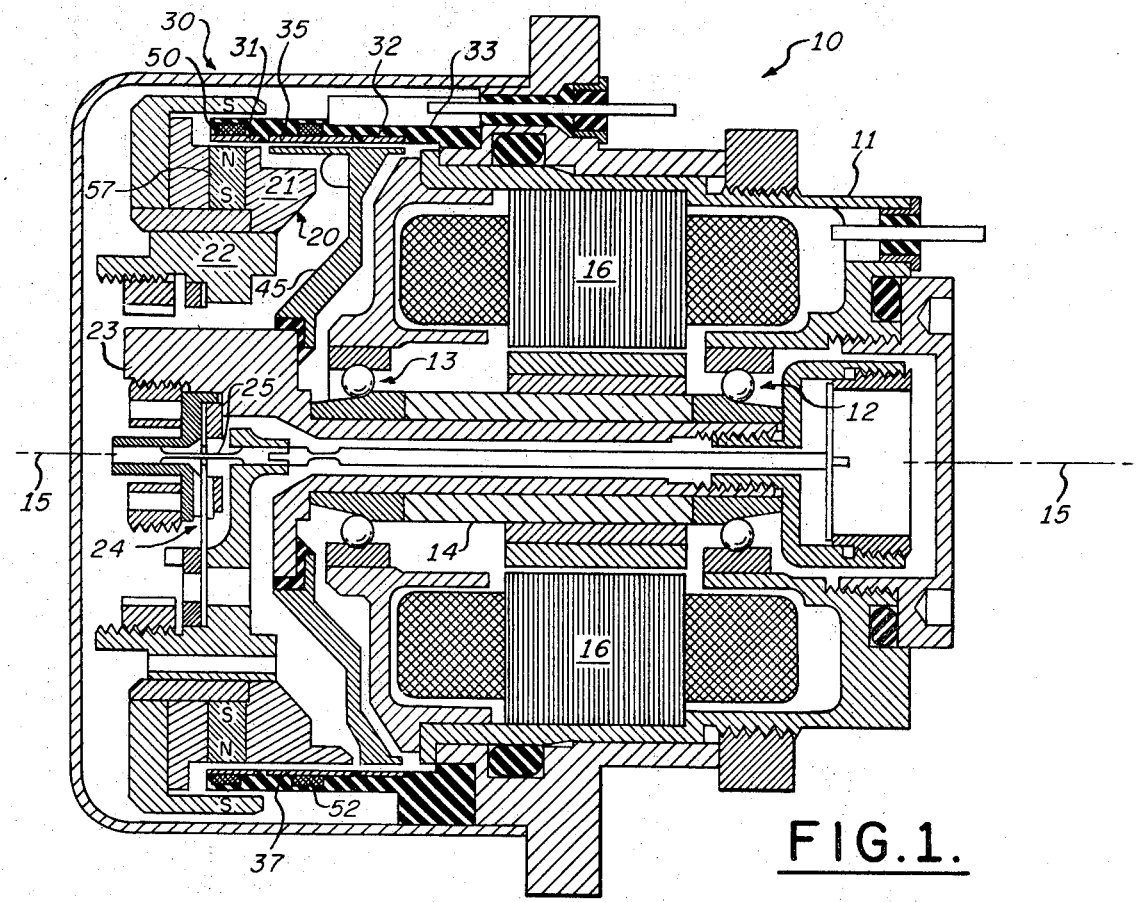
FIG. 1 is an elevation view in cross-section of a gyroscope incorporating one form of a pick-off and torquing device of the present invention.

Referring now to FIG. 1, one embodiment of the present invention is shown with respect to a gyroscope 10 having a housing 11 within which are mounted spaced ball bearings 12 and 13 that rotatably support a drive shaft 14 for rotation about a spin axis 15. The drive shaft 14 is rotated by a conventional spin motor 16. A gyroscopic rotor 20 having a heavy inertia rim 21 and a web 22 is radially supported on an extension 23 of the drive shaft 14 by means of a radial flexure support member 24 for universal tilting about axes perpendicular to the spin axis 15, in a manner described in detail in applicant's U.S. patent application Ser. No. 720,127, filed Apr. 10, 1968 and assigned to the same assignee. The radial flexure support member 24 also transmits driving torques from the drive shaft 14 to the gyroscopic rotor 20. Axial support of the gyroscopic rotor 20 is provided by another flexure support means 25 which is also connected to the drive shaft 14 to provide for universal tilting of the gyroscopic rotor 20 about axes perpendicular to the spin axis 15, in a manner more fully described in said U.S. patent application Ser. No. 720,127.

Figure 2:
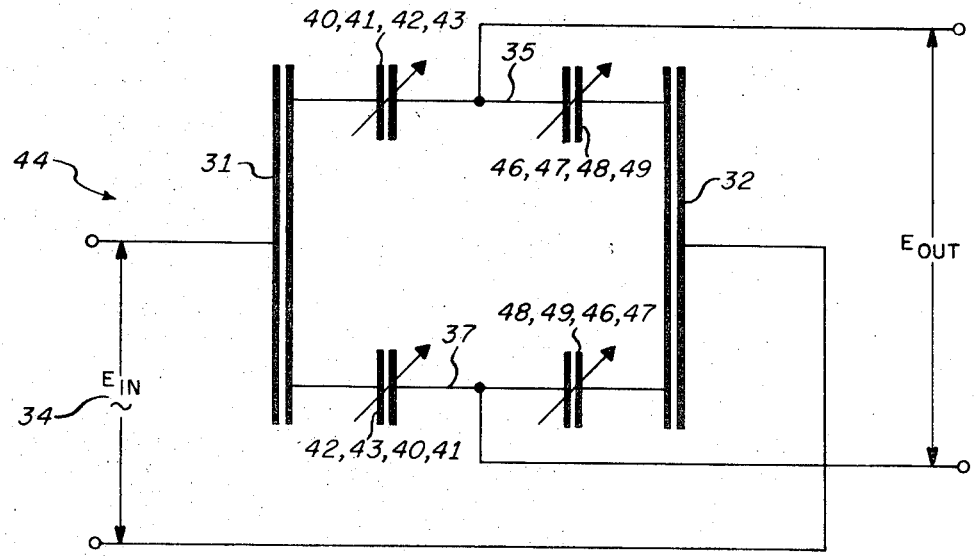
FIG. 2 is a schematic wiring diagram showing the capacitive bridge circuit of FIG. 1.
Figure 3:
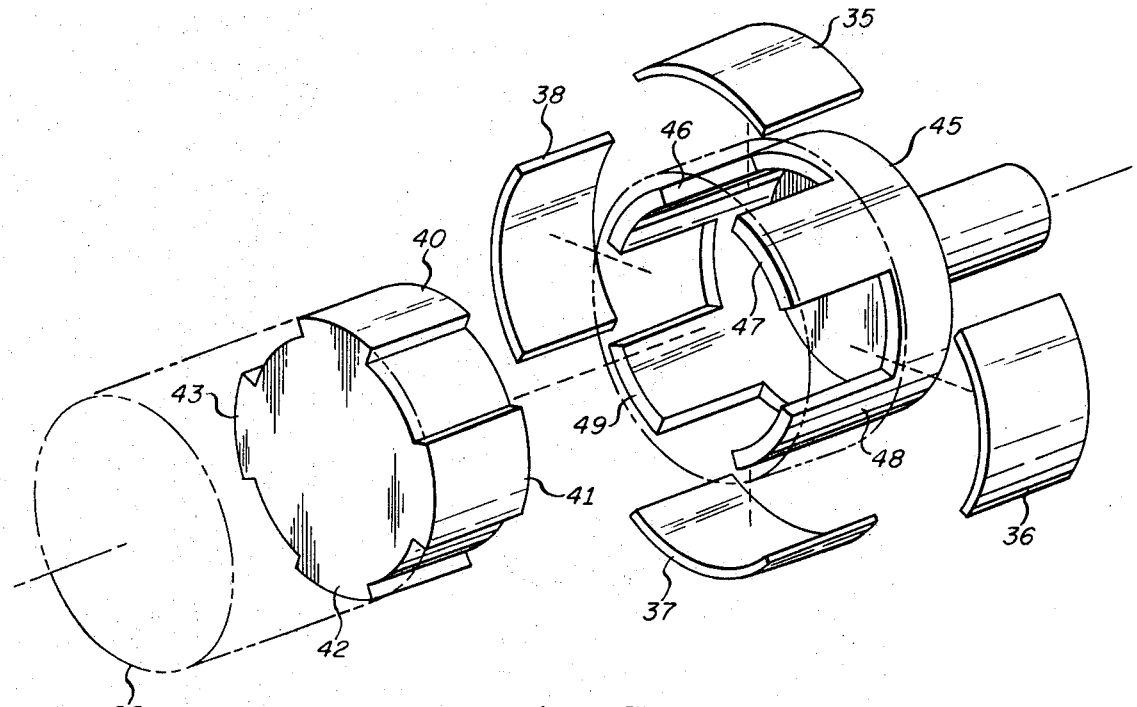
FIG. 3 is a perspective view showing the relative positions of the capacitive plates of FIG. 1.

To sense the position of the gyroscopic rotor 20 and to torque the gyroscopic rotor 20 about axes perpendicular to the spin axis 15, a combined pick-off and torquing device 30 is provided. The capacitive pick-off portion of the device 30 includes two spaced annular capacitor plates 31 and 32 mounted on an annular non-conductive support member 33 which in turn is secured to the housing 11. As shown in FIG. 2, the capacitor plates 31 and 32 are connected to a suitable excitation source 34 such as a high frequency A.C. voltage, for example, 50 volts, 100 kHz. As shown in FIG. 3, capacitive pick-off plates 35, 36, 37 and 38 are disposed in spaced, quadrature relation and intermediate with respect to the excitation plates 31 and 32 on the annular support member 33 thereby forming four arcuate shaped capacitive plates equiangularly spaced around the inside circumference of the annular support member 33. The periphery of the rotor 20 includes four arcuate shaped capacitive plates 40, 41, 42 and 43 in spaced relation and cooperative with the excitation plate 31 and the output plates 35, 36, 37 and 38. The drive shaft 15 includes an extension 45 which has mounted on its periphery four arcuate shaped capacitive plates 46, 47, 48 and 49 which are disposed in spaced relation and cooperative with excitation plate 32 and pick-off plates 35, 36, 37 and 38.

Preferably, the rotor-mounted capacitive plates 40, 41, 42 and 43 are disposed in spaced interlocking relationship with respective shaft-mounted capacitive plates 46, 47, 48 and 49. In the direction of the axis 15, each of the capacitive plates 40, 41, 42 and 43 extends across the output plates 35, 36, 37 and 38. Similarly, each of the capacitive plates 46, 47, 48 and 49 extends across the output plates 35, 36, 37 and 38.

As shown in FIG. 2, the capacitive plates are disposed in a bridge circuit 44 with the plates being arranged as shown to compensate for any misalignment of the shaft 14 with respect to the housing 11 which would otherwise tend to introduce a gyroscopic drift effect. To accomplish this result, the excitation plates 31 and 32 form the input junctions of the bridge circuit 44 with the output plates forming the output junctions. FIG. 2 shows the sequence of the rotating plates, in terms of sequential reference numeral, past the fixed output plates 35 and 37 assuming a counterclockwise rotation with respect to the arrangement of FIG. 3.

In order to apply a torque to the gyroscopic rotor 20, torquing coils 50, 51, 52 and 53 are disposed in the annular support member 33 at equiangularly spaced locations around the circumference and connected to a suitable D.C. current source not shown. The torquing coils are cooperative with an annular permanent magnet 57 disposed about the periphery of the rotor 20. The permanent magnet 57 has a north pole disposed adjacent the capacitive plate 31 on one side of the torquing coil and a south pole piece extending around the other side of the torquing coils 50–53 thereby providing a magnetic flux field across the torquing coils 50–53.

Figure 4:
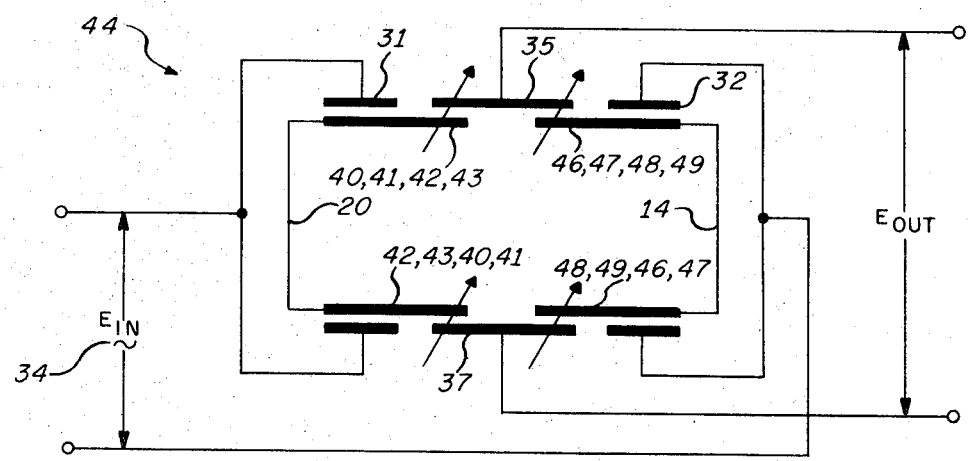
FIG. 4 is a schematic wiring diagram showing the capacitive bridge circuit of FIG. 1 in another form.
Figure 5:
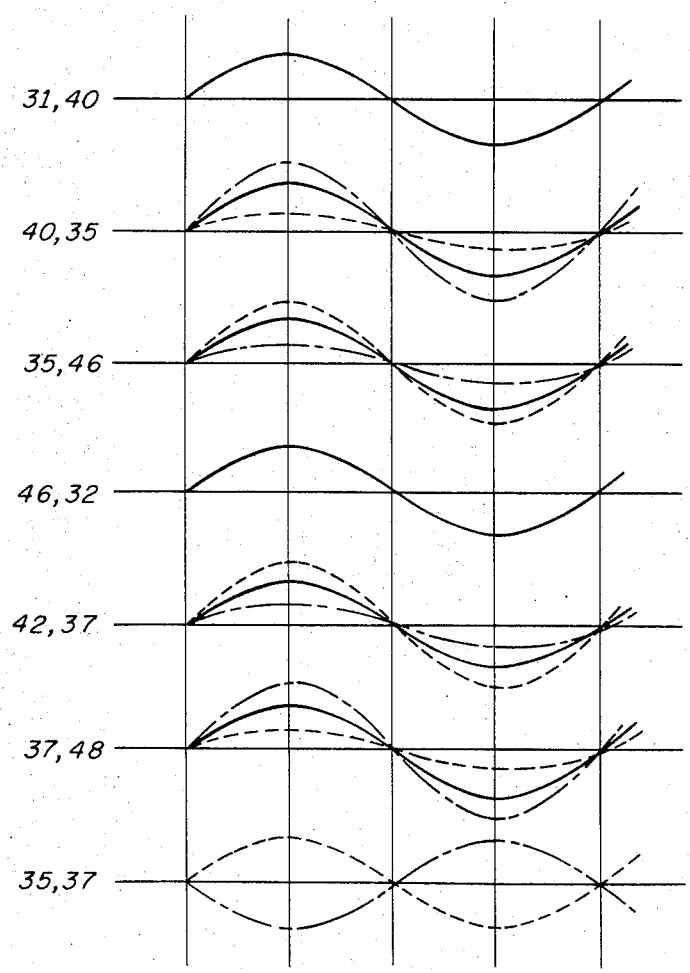
FIG. 5 is a series of graphs showing the signals across the referenced capacitive plates with respect to FIG. 4.

In operation, as shown in FIG. 4, with the drive shaft 14 and the rotor 20 spinning and with a high frequency A.C. voltage applied to the excitation plates 31 and 32, the diametrically opposed output plates such as 35 and 37 on the support member 33 become the output plates of the capacitive bridge 44 to produce an output signal having an amplitude and phase proportional to the displacement of the gyroscopic rotor 20 with respect to the housing 11 which is compensated for any misalignment of the shaft 14 with respect to the housing 11. This can be appreciated by referring to FIG. 5 which is a series of graphs showing the signals across the referenced capacitive plates which provide the composite output signal which is representative of the rotor displacement compensated for misalignment of the shaft position. The solid lines on the graphs indicate typical voltages appearing across the respective plates as referenced by voltage subnumerals with no displacement of the rotor 20 with respect to the shaft 14, i.e., a null condition. The dash lines on the graphs indicate the voltages appearing across the respective plates with the rotor 20 displaced but with the shaft 14 not displaced. The dot-dash lines on the graphs indicate the voltages appearing across the respective plates with the shaft 14 displaced but with the rotor 20 not displaced. The last graph in the series shows the inherent compensation for misalignment in the composite output signal from the output plates 35 and 37.

It will also be appreciated that with the output plates effectively mounted on the housing 11, the output signals appear at points that are referenced to the fixed housing 11 thereby eliminating the need for a reference generator, slip rings or rotary transformers.

In order to apply a torque to the gyroscopic rotor 20, a D.C. current is applied to the torquing coils 90° displaced from the axis about which the gyro is to be torqued. The current flowing through the torquing coils with respect to this axis results in a force being applied to the gyroscopic rotor 20 in a direction to precess it back to its desired position.

Figure 6:
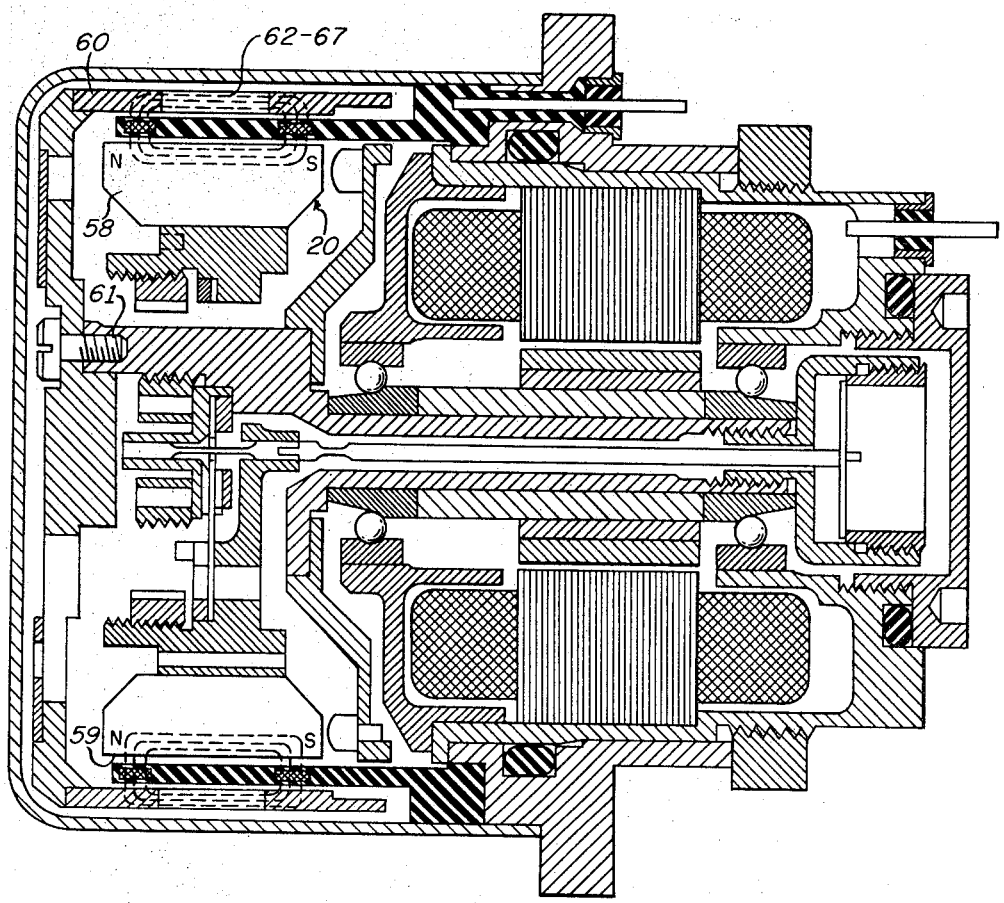
FIG. 6 is an elevation view in cross-section of a gyroscope incorporating an electromagnetic version of a pick-off and torquing device.
Figure 7:
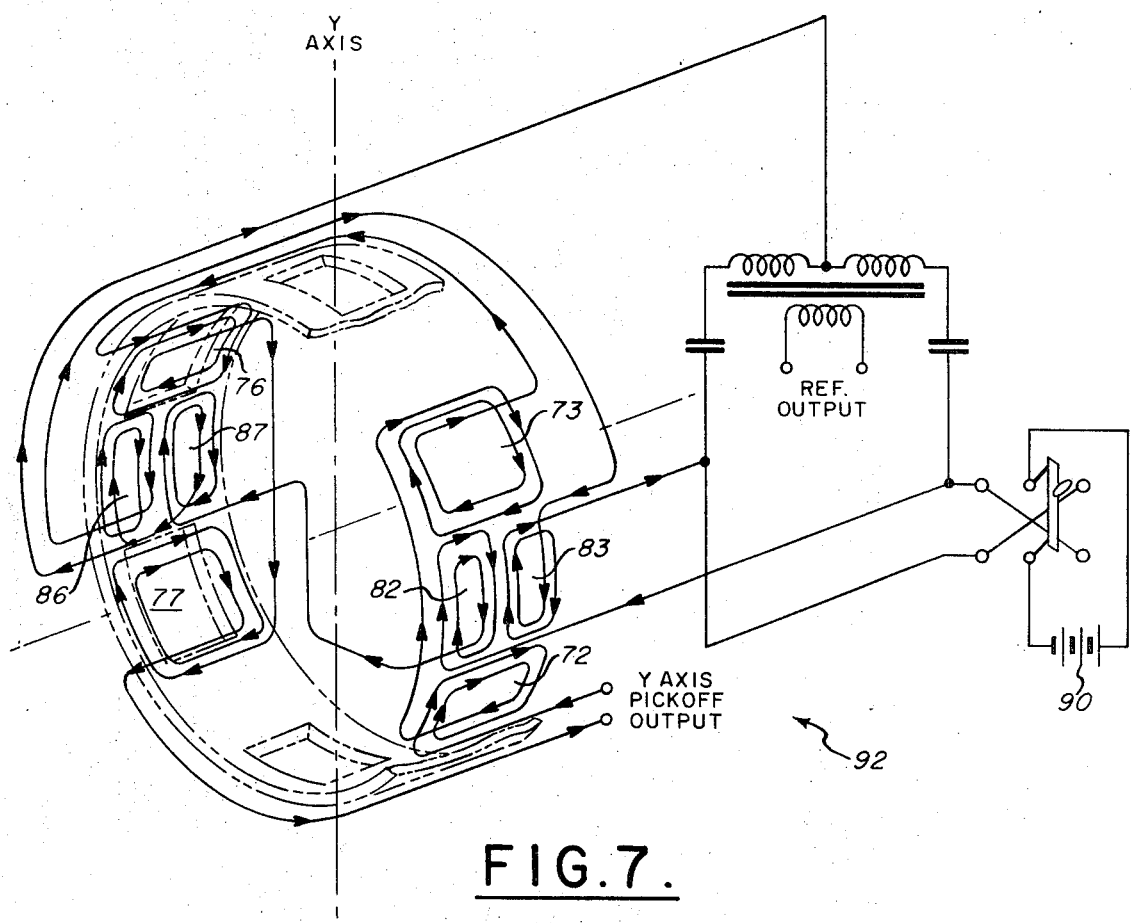
FIG. 7 is a perspective schematic showing a portion of the coil assembly of FIG. 6.

An alternative embodiment of a combined pick-off and torquing device of an electromagnetic type is shown in FIGS. 6 and 7. In this embodiment, the periphery 59 of the gyroscopic rotor 20 is magnetized in an axial direction, i.e., parallel to the axis 15 in order that the magnet 58 has a north pole at one end and a south pole axially disposed at its other end. The flux path is circular as indicated by the dotted lines to extend through arcuate-shaped pick-off, torquing and reference coils mounted on the annular support member 33 and flows through a flux return path member 60 which is connected to an extension 61 of the shaft 14. The annular flux return path member 60 circumscribes the coils in the support member 33 and has a plurality of equally spaced apertures 62 through 67.

Figure 8:
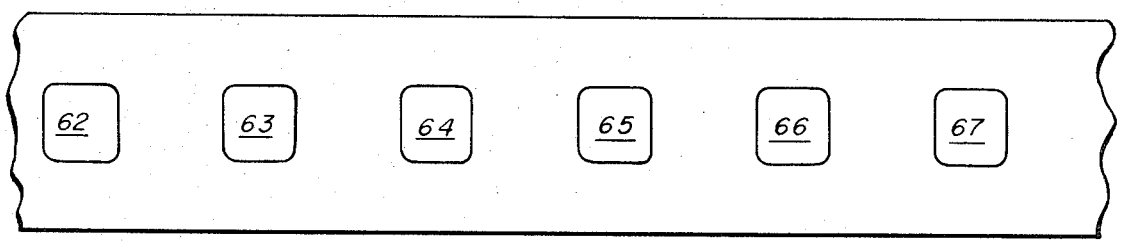
FIG. 8 is a schematic layout view of the coil assembly of FIG. 6.
Figure 8:
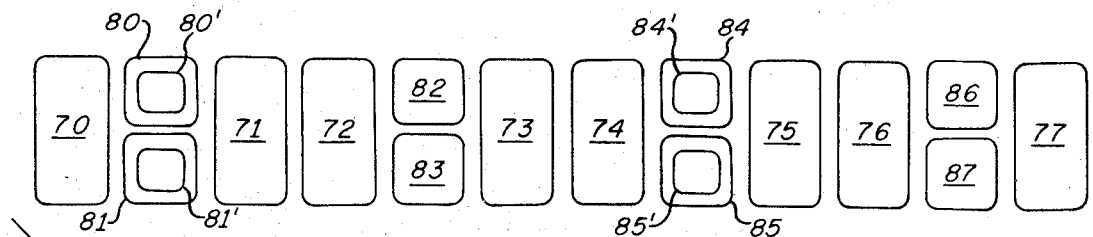
Figure 9:
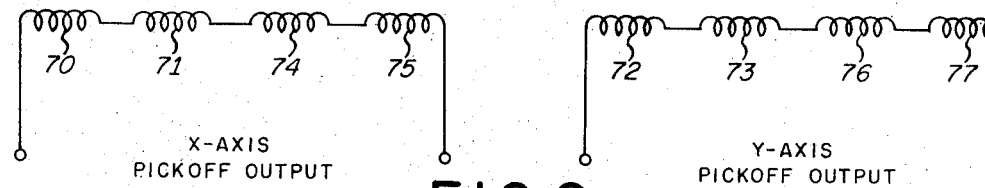
FIG. 9 is a schematic wiring diagram of the pick-off coils of FIG. 6.
Figure 10:
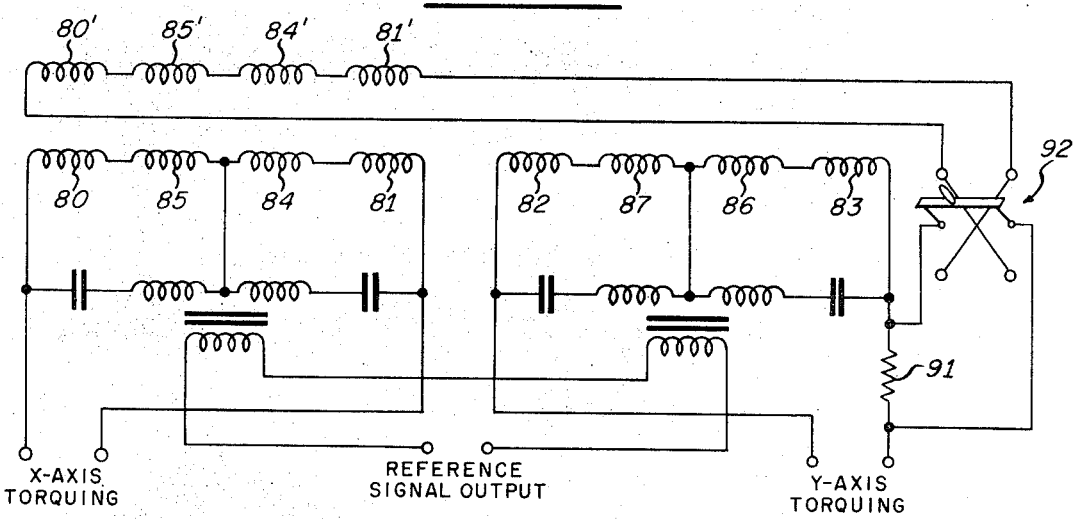
FIG. 10 is a schematic wiring diagram of the torquing coils of FIG. 6.

The relative position of the pick-off coils 70 to 77 and the combined torquing and reference coils 80 to 87 as mounted on the annular support member 33 are shown in layout form in FIG. 8. The pick-off coils are proportioned so that their axial length is greater than the axial length of the apertures 62 through 67 and their circumferential length encloses at least one aperture. A typical coil assembly 92 is shown in FIG. 7 for pick-off, reference generator and torquing coils with respect to one output and torquing axis Y. Each pick-off coil comprises rectangularly wound identical wire loops similar to standard meter coils. The pick-off coils with respect to a particular axis are connected in series aiding as shown in FIGS. 7 and 9. As shown in FIGS. 7 and 10, the torquing coils with respect to a particular axis are connected in series aiding and to a D.C. source such as 90. In order to facilitate trimming of the torquing axes to a precise 90° relationship, an additional group of trimming coils 80′, 81′, 84′ and 85′ is wound concentric with the reference coils used to torque about one axis. A portion of the current used to torque about the orthogonal axis is passed through the trimming coils 80′, 81′, 84′ and 85′ via a resistor 91 and a reversing switch 92 to effectively shift the torquing axis.

In operation, as shown in FIG. 7, in the null condition, when the rotor 20 and the shaft 14 are aligned, an equal flux passes from one pole of the magnet to the apertured section of the shaft member 60 as it passes from the apertured section to the opposite pole of the magnet. As long as the pick-off coils enclose the entire apertured portion, no voltage is induced by the rotation of the solid portion passed the fixed coils.

However, when the rotor 20 is displaced from the shaft 14 about an axis perpendicular to the plane of FIG. 6, the balance of the flux to and from the apertured region is unbalanced in the region of the pick-off coils and an A.C. voltage whose magnitude is proportional to the magnitude of the displacement is induced in the pick-off coils with respect to a particular axis. The phase of the output signal for one direction of displacement is 180° displaced from its phase for the opposite direction of displacement, and the frequency is a fixed multiple of the spin speed.

The use of diametrically opposed pick-off coils in series opposition minimizes the sensitivity to axial displacements of the rotor with respect to the shaft. It will be noted that the pick-off signals for the two perpendicular axes of this type of gyro can be made to have like phase or quadrature phase depending upon the number of apertures on the member 60 which in certain applications may be desirable for signal separation purposes.

Torquing of the gyroscopic rotor 20 is accomplished by passing D.C. current through the torquing coils which results in a torque applied to the rotor, in a manner similar to that explained with respect to FIG. 1.

Figure 11:
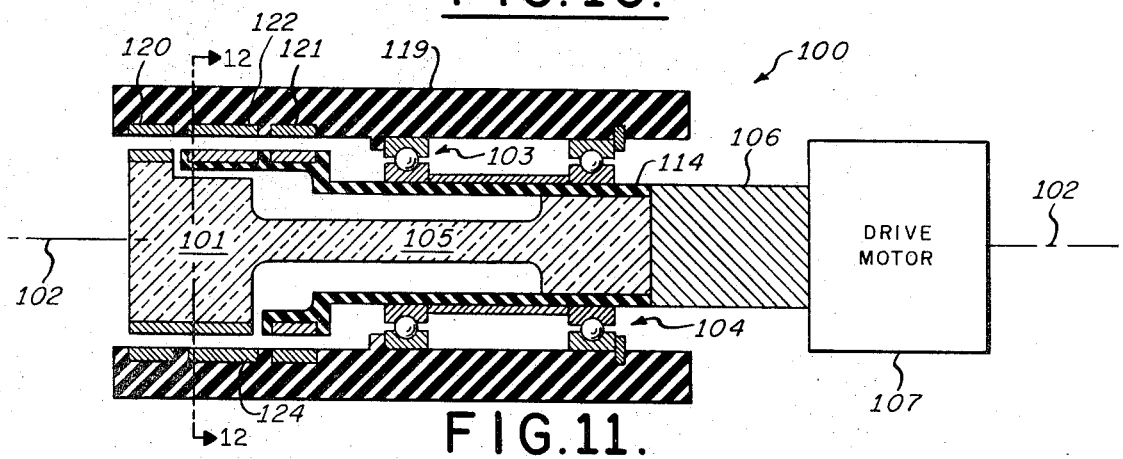
FIG. 11 is an elevation view in cross-section taken along lines 11—11 of FIG. 12 of an accelerometer having a capacitive pick-off similar to FIG. 1.

The capacitive pick-off device explained with respect to FIG. 1 is also advantageous when adapted to accelerometers of the rotating mass type such as shown in FIG. 11.

Precision accelerometers known in the prior art are usually of the closed loop type wherein the inertial mass is positioned by an electromagnetic force generator operating in a feedback loop to null the output of a sensitive displacement transducer. The embodiment of the present invention uses rotational averaging and a capacitive pick-off to minimize the null stability problem. This results in the elimination of the prior art electromagnetic force balance feedback loop and provides an accurate and extremely low cost accelerometer.

Figure 12:
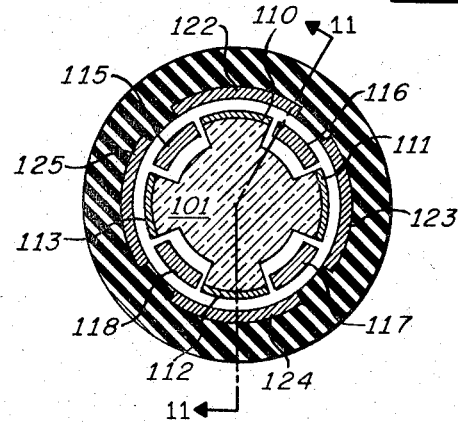
FIG. 12 is a sectional view of FIG. 11 taken along lines 12—12.

Referring now to FIGS. 11 and 12, an accelerometer 100 having an inertial mass 101 is mounted for rotation about an axis 102 defined by spaced bearings 103 and 104. The inertial mass 101 is flexibly connected by a cantilever flexure section 105 to a drive shaft 106 that in turn is driven by a conventional drive motor 107. The inertial mass 101 is non-conducting with four arcuate shaped capacitive plates 110, 111, 112, and 113 as shown in FIG. 12, disposed in spaced, quadrature relation on the periphery of the mass 101. The drive shaft 106 includes an extension 114 which has mounted on its periphery four arcuate-shaped capacitive plates 115, 116, 117 and 118. The non-conductive housing 119 has two spaced annular excitation plates 120 and 121 that are connected to a suitable excitation source (not shown). Four pick-off plates 122, 123, 124 and 125 are disposed in spaced, quadrature relation and intermediate the excitation plates 120 and 121. To be cooperative with the mass-mounted plates 110, 111, 112 and 113 and the interlocking shaft-mounted plates 115, 116, 117 and 118, respectively, in a manner similar to that described with respect to the gyroscope of FIG. 1.

In operation, with a high frequency A.C. voltage applied to the excitation plates 120 and 121, and the mass 101 rotating, the diametrically opposed output plates on the housing 119 become the output points of a capacitive bridge of the type shown in FIG. 2 above which provides an output proportional to the displacement of the mass 101 with respect to the shaft 106 in a manner similar to that explained above with respect to the gyroscope of FIG. 1. The output signal is independent of any shift of the axis of rotation 102 with respect to the housing 119. When averaged over a complete revolution, the output is then proportional to the acceleration perpendicular to the spin axis 102. The output signals appear at points on the fixed housing 119 which can be connected directly to amplifying or other apparatus without the need for slip rings or rotary transformers.

While the invention has been described in its preferred embodiments, it is to be understood that the words which have been used are words of description rather than limitation and that changes within the purview of the appended claims may be made without departing from the true scope and spirit of the invention in its broader aspects.

I claim:

1. In inertial apparatus:
   a housing,
   a sensitive element,
   means including shaft means for rotatably supporting said sensitive element for movement within said housing, and
   pick-off means having a first portion mounted on said sensitive element, a second portion mounted on said shaft means and a third portion mounted on said housing for providing an output signal accurately representative of the relative position of said sensitive element with respect to said shaft means along axes referenced to said housing.

2. In inertial apparatus of the character recited in claim 1 in which said first portion of said pick-off means is responsive to the relative position of said sensitive element with respect to said housing, said second portion is responsive to the relative position of said shaft means with respect to said housing and said output signal is compensated for misalignment of said shaft means with respect to said housing.

3. In inertial apparatus of the character recited in claim 1 in which said first and second portions of said pick-off means are capacitive.

4. In inertial apparatus of the character recited in claim 1 in which said first and second portions of said pick-off means are electromagnetic.

5. In inertial apparatus of the character recited in claim 1 and further including:
   support means secured to said housing,
   said pick-off means having output portions mounted on said support means and defining output reference axes.

6. In inertial apparatus of the character recited in claim 5 and further including torquing means having torquing elements mounted on said support means for torquing said sensitive element with respect to said reference axes.

7. In inertial apparatus of the character recited in claim 5 in which said pick-off means includes excitation means mounted on said support means, said excitation means and said first and second portions of said pick-off means being disposed in a bridge circuit for providing an output signal representative of the relative position of said sensitive element with respect to said housing compensated for misalignment of said shaft with respect to said housing.

8. A combined pick-off and torquing device comprising:
   an annular permanent magnet having an axis of symmetry,
   an annular magnetic flux return path member in spaced relation to said annular permanent magnet to form an air gap therebetween and having its axis of symmetry coaxial with that of said annular permanent magnet,
   said return path member having a plurality of equi-angularly spaced non-return path segments disposed circumferentially, and
   pick-off, torquing and excitation coil means disposed intermediate and in cooperative relation with said permanent magnet and said return path member in said air gap and mounted on an annular support member having its axis of symmetry coaxial with that of said permanent magnet.

9. A combined pick-off and torquing device of the character recited in claim 8 and further including shaft means adapted for rotating said permanent magnet about said axis of symmetry, said return path member being an extension of said shaft means.

10. Inertial apparatus comprising:
    a housing,
    a sensitive element,
    drive means including drive shaft means rotatably mounted with respect to said housing for rotatably supporting said sensitive element for spinning about a spin axis within said housing, flexure means flexibly coupling said sensitive element to said drive shaft means to permit movement of said sensitive element with respect to axes perpendicular to said spin axis, and pick-off means for measuring the relative displacement of the spin axis of said sensitive element with respect to said drive shaft means.

11. Inertial apparatus of the character recited in claim 10 in which said sensitive element is an inertial mass mounted for translational movement in accordance with accelerations with respect to said axes perpendicular to said spin axis.

12. Inertial apparatus of the character recited in claim 10 in which said sensitive element is a gyroscopic rotor mounted for precessional movement with respect to said axes perpendicular to said spin axis.

References Cited
UNITED STATES PATENTS

| | | | |
|---|---|---|---|
| 3,077,785 | 2/1963 | Stiles | 74—5 |
| 3,211,011 | 10/1965 | Litty | 74—5 |
| 3,309,931 | 3/1967 | Adams et al. | 74—5.6 |
| 3,354,726 | 11/1967 | Krupick et al. | 74—5.6X |
| 3,394,597 | 7/1968 | Frohmberg et al. | 74—5.6 |
| 2,852,943 | 9/1958 | Sedgfield | 74—5.6X |
| 3,365,960 | 1/1968 | Siff et al. | 74—5X |

MANUEL A. ANTONAKAS, Primary Examiner

U.S. Cl. X.R.

74—5